US011438157B2

(12) United States Patent
Miao et al.

(10) Patent No.: US 11,438,157 B2
(45) Date of Patent: Sep. 6, 2022

(54) METHOD AND SYSTEM FOR DATA OWNERSHIP CONFIRMATION BASED ON ENCRYPTION

(71) Applicant: Chengdu Yunshuzhilian Technology Co., Ltd., Sichuan (CN)

(72) Inventors: Fang Miao, Sichuan (CN); Yan Xie, Sichuan (CN); Wenhui Yang, Sichuan (CN)

(73) Assignee: CHENGDU YUNSHUZHILIAN TECHNOLOGY CO., LTD., Sichuan (CN)

( * ) Notice: Subject to any disclaimer, the term of this patent is extended or adjusted under 35 U.S.C. 154(b) by 226 days.

(21) Appl. No.: 16/829,903

(22) Filed: Mar. 25, 2020

(65) Prior Publication Data
US 2020/0228334 A1    Jul. 16, 2020

Related U.S. Application Data

(63) Continuation-in-part of application No. PCT/CN2018/104340, filed on Sep. 6, 2018.

(30) Foreign Application Priority Data

Sep. 26, 2017  (CN) .......................... 201710800793.9

(51) Int. Cl.
*G06F 11/30* (2006.01)
*G06F 12/14* (2006.01)
(Continued)

(52) U.S. Cl.
CPC .................. *H04L 9/32* (2013.01); *H04L 9/30* (2013.01); *G06Q 30/06* (2013.01); *H04L 9/006* (2013.01)

(58) Field of Classification Search
CPC .. H04L 9/32; H04L 9/30; H04L 9/006; G06Q 30/06
(Continued)

(56) References Cited

U.S. PATENT DOCUMENTS

2011/0202758 A1    8/2011  Holden et al.
2015/0134552 A1*   5/2015  Engels .................. H04L 9/3297
                                             705/318
2017/0169250 A1*   6/2017  White ....................... H04L 9/14

FOREIGN PATENT DOCUMENTS

CN          103793660 A       5/2014
CN          104980477 A      10/2015
(Continued)

OTHER PUBLICATIONS

International Search Report dated Dec. 12, 2018 in International Application No. PCT/CN2018/104340.

*Primary Examiner* — Fatoumata Traore
*Assistant Examiner* — Samuel Ambaye
(74) *Attorney, Agent, or Firm* — Saliwanchik, Lloyd & Eisenschenk

(57) ABSTRACT

The present disclosure discloses a method and system for data ownership confirmation based on encryption. The method comprises following steps: determining whether data is open; and if the data can be open, encrypting, by a data owner, the data by using a private key of the data owner to complete ownership declaration, and ending a process; or if the data cannot be open, determining whether the data is shared; and if the data cannot be shared, encrypting, by the data owner, the data by using a public key of the data owner to complete data protection, and ending a process; or if the data can be shared, proceeding to ownership declaration and protection steps. The method achieves data ownership confirmation, technically ensures proprietary of data ownership, (Continued)

and implements unique ownership of the data owner for the data, laying a foundation for data responsibility, right, and profit allocation.

15 Claims, 3 Drawing Sheets

(51) Int. Cl.
  *H04L 9/32*      (2006.01)
  *H04L 9/30*      (2006.01)
  *H04L 9/00*      (2022.01)
  *G06Q 30/06*     (2012.01)
(58) Field of Classification Search
  USPC .......................................................... 713/193
  See application file for complete search history.

(56) References Cited

FOREIGN PATENT DOCUMENTS

| | | |
|---|---|---|
| CN | 105450669 A | 3/2016 |
| CN | 106815728 A | 6/2017 |
| CN | 107196762 A | 9/2017 |
| CN | 107563869 A | 1/2018 |

* cited by examiner

METHOD AND SYSTEM FOR DATA OWNERSHIP CONFIRMATION BASED ON ENCRYPTION

CROSS-REFERENCE TO RELATED APPLICATIONS

This application is a continuation-in-part of International Patent Application No. PCT/CN2018/104340, filed Sep. 6, 2018, which claims priority to Chinese Patent Application No. 201710800793.9, filed Sep. 26, 2017, the disclosures of each of which are incorporated herein by reference in their entirety.

FIELD OF THE INVENTION

The present disclosure relates to the field of information processing technologies, and more particularly to a method and system for data ownership confirmation based on encryption.

BACKGROUND OF THE INVENTION

With continuous development of data technologies, data transaction and ownership-based data application have become important data application behavior. Current data transaction still uses a conventional commodity sale manner in which a data seller negotiates with an exchange to determine a price of data to be traded and sells the data on the market. Due to replicable, modifiable, and reusable attributes of data, the conventional commodity sale manner cannot meet data transaction requirements, and cannot better support data opening, sharing, and application. Therefore, new data models and methods are urgently needed to ensure normal execution of data transaction.

Data ownership-based data application can be understood as a new data transaction mode, that is, data application in which data ownership confirmation and protection need to be considered.

In the present disclosure, based on a public key infrastructure (PKI), data ownership confirmation based on encryption is performed on data and a data owner who already has a CA identity by using the PKI.

BRIEF SUMMARY OF THE INVENTION

To resolve the foregoing technical problem, the present disclosure provides a method and system for data ownership confirmation based on encryption.

The present disclosure is implemented by using the following technical solutions:

A method for data ownership confirmation based on encryption relates to a data owner, a data agent, a data producer, and a data user. They are all data holders and all can determine data ownership through encryption. Any type of data holder can encrypt data by using a public key of the data holder, to determine ownership of the data holder for the data and protect the data; or can encrypt data by using a private key of the data holder, to declare ownership of the data holder for the data. The method comprises the following steps:

A. determining whether data can be open to public; and if the data can be open to public, encrypting, by a data owner, the data by using a private key of the data owner, to complete ownership declaration, and ending a process; or if the data cannot be open to public, proceeding to step B; and B. determining whether the data can be shared; and if the data cannot be shared, encrypting, by the data owner, the data by using a public key of the data owner, to complete data protection, and ending a process; or if the data can be shared, proceeding to ownership declaration and protection steps.

If data can be open to public, the data is open data. The open data is data that can be open to the public, and needs only ownership declaration of a data owner without a need of data protection. If data can be shared, the data is shared data. The shared data is data that is open to a specific group, and needs ownership declaration and data protection. If data cannot be shared, the data is non-shared data. The non-shared data is data that is not open to the public or the specific group, and is self-used by a data owner, and needs data protection without a need of ownership declaration. In the present disclosure, a public key encryption technology and a private key encryption technology are combined with ownership declaration and data protection based on the nature of data to implement data ownership confirmation and protection. Key points of the method comprise determining whether the data can be open to pubic and whether the data can be shared, and performing corresponding ownership declaration or data protection operations by using the public key encryption technology or the private key encryption technology based on different determining results. In this process, both a sequence of determining whether the data can be open to public, determining whether the data can be shared and the processing sequence of private key encryption performed based on the determining result to implement ownership declaration or public key encryption performed based on the determining result to implement data protection are extremely important and form a specific data ownership confirmation method. The method in the present disclosure realizes data ownership confirmation allowing the data owners implement ownership confirmation and data protection for their own data, technically ensures proprietary of data ownership, implements unique ownership of the data owners for their data, lays a foundation for data responsibility, right, and profit allocation, ensures that the data has an owner to be searched for, provides a foundation for data transaction, and provides a foundation support for designing an effective secure data sharing method.

Preferably, the ownership declaration and protection steps are own ownership declaration and protection steps, and the own ownership declaration and protection steps are as follows:

encrypting, by the data owner, the data by using the public key of the data owner to complete data protection; and determining whether data ownership needs to be declared; and if data ownership does not need to be declared, ending the process; or if data ownership needs to be declared, encrypting, by the data owner, the data by using the private key of the data owner to complete ownership declaration.

Preferably, the ownership declaration and protection steps are agent ownership declaration and protection steps, and the agent ownership declaration and protection steps are as follows:

determining whether the data needs an agent; and if the data does not need an agent, performing ownership declaration and protection on the data by using own ownership declaration and protection steps; or if the data needs an agent, proceeding to step C1;

C1. determining whether the data owner needs to declare data ownership; and if the data owner does not need to declare data ownership, proceeding to step C2; or if the data owner needs to declare data ownership, encrypting, by the data owner, the data by using the private key of the data owner to complete ownership declaration, and proceeding to step C2;

C2. encrypting, by a data agent, the data by using a public key of the data agent; and C3. determining whether the third-party data agent needs to declare data ownership; and if the third-party data agent does not need to declare data ownership, ending the process; or if the third-party data agent needs to declare data ownership, encrypting, by the data agent, the data by using a private key of the data agent to complete ownership declaration.

The ownership declaration and protection steps relate to two entities. One entity is the data owner, and the other entity is the data agent. Based on data use requirements, there are different implementation entities of ownership declaration and protection. Based on different implementation entities, ownership confirmation can be classified into active ownership confirmation and passive ownership confirmation. The active ownership confirmation means that the data owner completes data ownership confirmation and data protection. Different levels of data have different uses and also have different ownership confirmation processes. The passive ownership confirmation means that the data agent completes data ownership confirmation and data protection. The ownership confirmation aims to make data dynamic, grant an ownership characteristic to data, make clear an owner of data in a virtual network world, and establish a secure and orderly data access basis for data that can be open and shared. If the data does not need an agent, the data owner directly encrypts the data by using the public key and the private key to implement active ownership confirmation.

Further, if the data needs an agent, the method further comprises:

encrypting, by the data owner, the data by using the public key of the data agent, and granting a permission of data processing to the data agent; and decrypting, by the data agent, the data by using the private key, and performing ownership confirmation on the data based on the agent ownership declaration and protection steps.

Further, a specific method of granting the permission is as follows:

sending, by the data agent, identity information encrypted by using the private key to the data owner; and performing, by the data owner, authorization confirmation on the data agent based on the identity information, and agreeing on an operation permission of the data agent for the data.

Further, a specific method of granting the permission performed by the data owner for the data agent is as follows:

encrypting, by the data owner by using the public key of the data agent, the data that needs an agent;

retrieving, by the data agent, the data encrypted by using the public key of the data agent; and completing authorization for the data agent, and performing, by the data agent, a data agent operation based on content of an authorization contract.

As an agent of the data owner, the data agent implements data management. The foregoing authorization manners comprise an active authorization manner and a passive authorization manner. The data agent constrains ownership of the data agent based on the content of the contract.

Preferably, if there are K data owners and K is a natural number greater than 1, the method further comprises:

an ownership sequence confirmation step: confirming a sequence of the data owners as $U_1, U_2, \ldots, U_K$; and an active concatenated ownership confirmation step: after performing ownership confirmation according to the foregoing method, encrypting, by a data owner, the data by using a public key of a next data owner; and decrypting, by the next data owner, the data by using a private key, and performing ownership confirmation according to the foregoing method, where the active concatenated ownership confirmation step is cycled until ownership confirmation of the K data owners is completed.

Preferably, if there are K data owners and K is a natural number greater than 1, the method further comprises:

an ownership sequence confirmation step: confirming a sequence of the data owners as $U_1, U_2, \ldots, U_K$; and a passive concatenated ownership confirmation step: separately encrypting, by the data owners, the data by using public keys of the data owners in the foregoing sequence, and then encrypting, by a data agent, the data by using a private key.

A system for data ownership confirmation based on encryption comprises:

a public key management module that identifies and determines an identity of a data owner and an identity of a data agent, and confirms a correspondence between the data owner/data agent and a public key; and an ownership confirmation module that implements data ownership confirmation and data protection by using the foregoing method.

Preferably, the system further comprises an ownership confirmation contract management module, where the ownership confirmation contract management module confirms an ownership confirmation sequence of data owners.

Compared with the prior art, the present disclosure has the following advantages and beneficial effects:

1. According to the method in the present disclosure, data ownership confirmation is implemented, to technically ensure proprietary of data ownership, implement ownership of a data owner, agent, user, and producer for data, and establish relationships between the data owner, agent, user, and producer and the data, thereby providing operability for data ownership confirmation.

2. According to the method in the present disclosure, ownership of a data owner and a data agent for data is implemented, laying a foundation for data responsibility, right, and profit allocation, ensuring that the data has an owner to be searched for, and providing a technical foundation for data transaction.

BRIEF DESCRIPTION OF THE DRAWINGS

The accompanying drawings described herein provide further understanding of the examples of the present disclosure, constitute a part of this disclosure, and constitute no limitation on the examples of the present disclosure. In the accompanying drawings.

DETAILED DESCRIPTION OF THE PREFERRED EMBODIMENTS

In order to make the objects, technical solutions and advantages of the present disclosure clearer, the following further describes the present disclosure in detail with reference to the examples and the accompanying drawings. Schematic implementations of the present disclosure and descriptions thereof are merely used to explain the present disclosure, and are not intended to limit the present disclosure.

EXAMPLE 1

A method for data ownership confirmation based on encryption, comprising the following steps:

A. determining whether data can be open to public; and if the data can be open to public, encrypting, by a data owner, the data by using a private key of the data owner, to complete ownership declaration, and ending the process; or if the data cannot be open to public, proceeding to step B; and B. determining whether the data can be shared; and if the data cannot be shared, encrypting, by the data owner, the data by using a public key of the data owner, to complete data protection, and ending the process; or if the data can be shared, proceeding to ownership declaration and protection steps.

Figure 1:
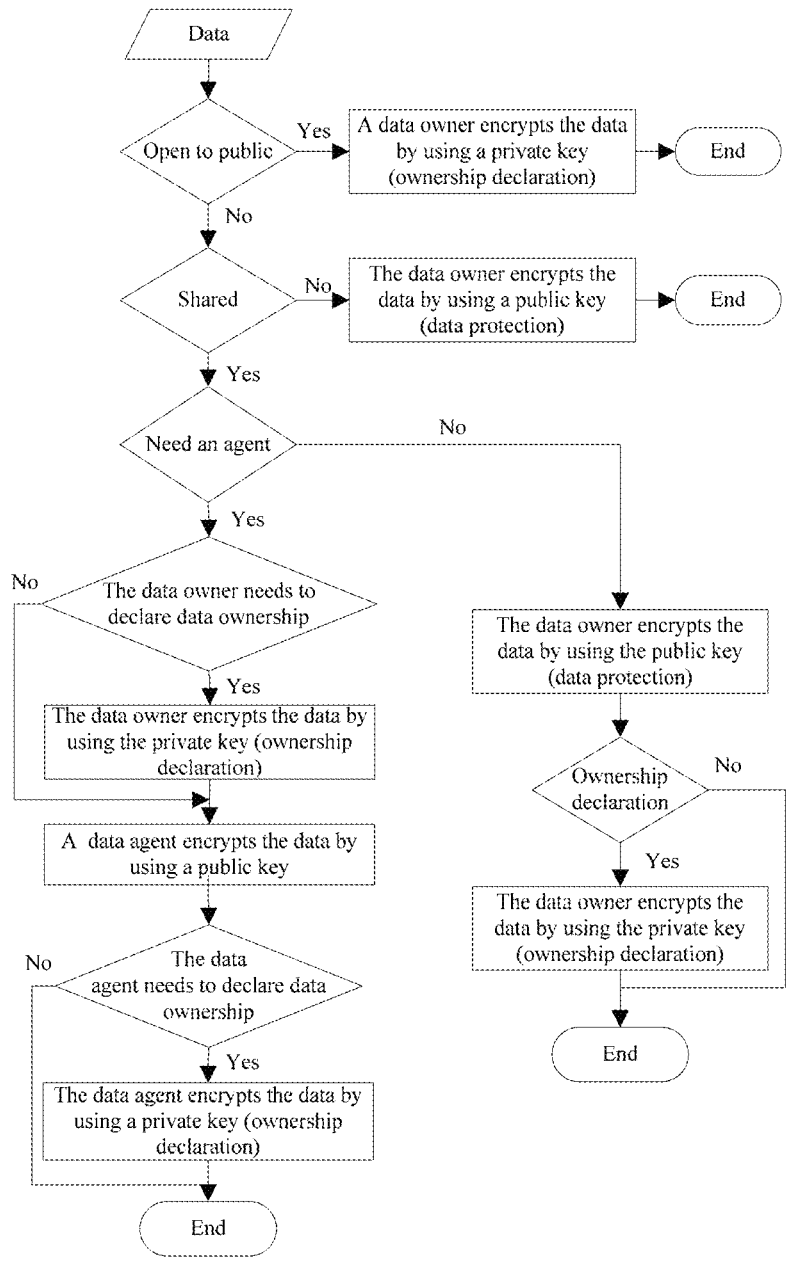
FIG. 1 is a flowchart of a method according to the present disclosure.

As shown in FIG. 1, the ownership declaration and protection steps comprise own ownership declaration and protection steps and agent ownership declaration and protection steps, that is, the ownership confirmation method comprises an active ownership confirmation method and a passive ownership confirmation method.

That is, for different data and different use cases, the foregoing methods are classified into multiple ownership confirmation methods, which are described in detail in the following examples.

EXAMPLE 2

This example describes an active ownership confirmation method in which own ownership declaration and protection steps are used. The method is specifically as follows:

A. determining whether data can be open to public; and if the data can be open to public, encrypting, by a data owner, the data by using a private key of the data owner to complete ownership declaration, and ending the process; or if the data cannot be open to public, proceeding to step B; and B. determining whether the data can be shared; and if the data cannot be shared, encrypting, by the data owner, the data by using a public key of the data owner to complete data protection, and ending the process; or if the data can be shared, encrypting, by the data owner, the data by using the public key of the data owner to complete data protection; and determining whether data ownership needs to be declared; and if data ownership does not need to be declared, ending the process; or if data ownership needs to be declared, encrypting, by the data owner, the data by using the private key of the data owner to complete ownership declaration.

EXAMPLE 3

This example describes a passive ownership confirmation method in which the agent ownership declaration and protection steps are used. The method is specifically as follows:

A. determining whether data is open to public; and if the data can be open to public, encrypting, by a data owner, the data by using a private key of the data owner to complete ownership declaration, and ending a process; or if the data cannot be open to public, proceeding to step B; and B. determining whether the data is shared; and if the data cannot be shared, encrypting, by the data owner, the data by using a public key of the data owner to complete data protection, and ending a process; or if the data can be shared, proceeding to a step for determining whether the data needs an agent;

determining whether the data needs an agent; and if the data does not need an agent, encrypting, by the data owner, the data by using the public key of the data owner to complete data protection; determining whether data ownership needs to be declared; and if data ownership does not need to be declared, ending the process; or if data ownership needs to be declared, encrypting, by the data owner, the data by using the private key of the data owner to complete ownership declaration; or if the data needs an agent, by the data owner, the data by using a public key of a data agent, and granting a permission of data processing to the data agent; and decrypting, by the data agent, the data by using a private key, and proceeding to step C1;

C1. determining whether the data owner needs to declare data ownership; and if the data owner does not need to declare data ownership, proceeding to step C2; or if the data owner needs to declare data ownership, encrypting, by the data owner, the data by using the private key of the data owner to complete ownership declaration, and proceeding to step C2;

C2. encrypting, by the data agent, the data by using the public key of the data agent; and C3. determining whether the third-party data agent needs to declare data ownership; and if the third-party data agent does not need to declare data ownership, ending the process; or if the third-party data agent needs to declare data ownership, encrypting, by the data agent, the data by using the private key of the data agent to complete ownership declaration.

EXAMPLE 4

In Example 3, the data owner delivers the data to the third-party data agent for management. To ensure rights and interests of the data owner and ensure data security, the data owner needs to grant an agent permission to the data agent. The agent permission granting can be implemented by using multiple methods as follows:

Method 1:

The data agent sends identity information encrypted by using the private key to the data owner; and the data owner performs authorization confirmation on the data agent based on the identity information, and agrees on an operation permission of the data agent for the data; and simultaneously an agent contract is formed between the data owner and the agent in terms of responsibilities and rights of both parties.

Method 2:

The data owner encrypts, by using the public key of the data agent, the data that needs an agent; and the data agent retrieves the data encrypted by using the public key of the data agent, and the data agent performs a data agent operation based on content of an authorization contract.

After the foregoing permission granting, the data agent obtained the agreed operation permission for the data.

EXAMPLE 5

Based on the foregoing examples, if there are multiple data owners, the steps of the foregoing examples are specifically as follows:

an ownership sequence confirmation step: confirming a sequence of the data owners as $U_1, U_2, \ldots, U_k$, wherein, K is a quantity of data owners; and an active concatenated ownership confirmation step: after performing ownership confirmation according to the methods in Example 1 and Example 2, encrypting, by a data owner, the data by using a public key of a next data owner; and decrypting, by the next data owner, the data by using a private key, and performing ownership confirmation according to the methods in Example 1 and Example 2, where the active concatenated ownership confirmation step is cycled until ownership confirmation of the K data owners is completed.

The method is described in detail by using three data owners.

Figure 2:
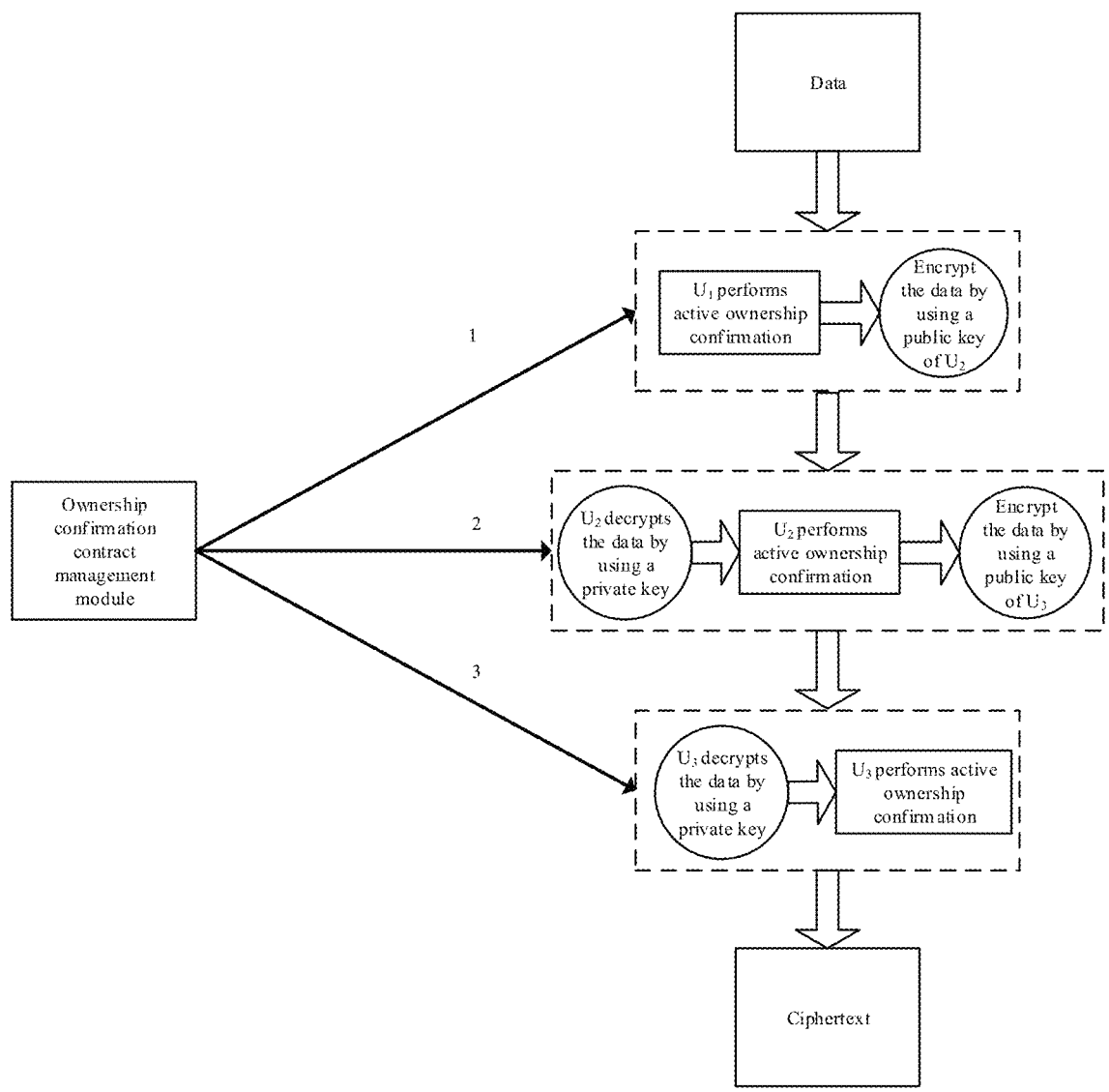
FIG. 2 is a principle diagram of active concatenated ownership confirmation according to the present disclosure.

As shown in FIG. 2, a data owner $U_1$ performs active ownership confirmation by using the method in Example 1, and encrypts the data by using a public key of $U_2$; after decrypting the data by using a private key, $U_2$ performs active ownership confirmation by using the method in Example 1, and encrypts the data by using a public key of $U_3$; and after decrypting the data by using a private key, $U_3$ performs active ownership confirmation by using the method in Example 1, and ends an entire ownership confirmation process.

Figure 3:
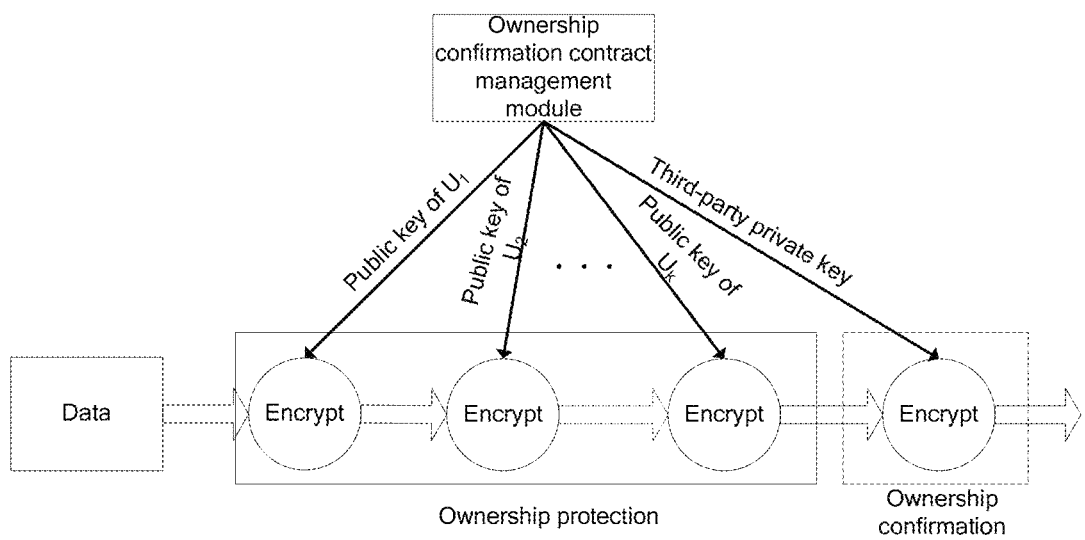
FIG. 3 is a principle diagram of passive concatenated ownership confirmation according to the present disclosure.

The active concatenated ownership confirmation method is provided above. Based on Example 3, a passive concatenated ownership confirmation method can also be used. As shown in FIG. 3, the method comprises:

an ownership sequence confirmation step: confirming a sequence of the data owners as $U_1, U_2, \ldots, U_k$, wherein K is a quantity of data owners; and a passive concatenated ownership confirmation step: separately encrypting, by the data owners, the data by using public keys of the data owners in the foregoing sequence, and then encrypting, by a data agent, the data by using a private key, to perform ownership declaration.

EXAMPLE 6

Based on the methods in the foregoing examples, this example discloses a system for implementing the foregoing methods. The system comprises a public key management module, an ownership confirmation module, and an ownership confirmation contract management module, wherein, the public key management module identifies and determines an identity of the data owner and/or an identity of the data agent, and confirms a correspondence between the data owner and a public key, the ownership confirmation module implements data ownership confirmation and data protection according to the methods in Example 1 to Example 5, and the ownership confirmation contract management module confirms an ownership confirmation sequence of data owners, wherein, the identity information identification can ensure a data user identity based on biometric information.

According to the method and the system of the solutions, ownership is granted to data, and a data owner can perform data ownership confirmation by changing an asymmetric encryption process to make clear data ownership in form, technically ensure proprietary of data ownership, implement unique ownership of the data owner for the data, and implement that a user uses data based on ownership, resolving problems such as data leakage and forgery in source, ensuring favorable development of data ecological environment, and providing a technical basis and guarantee for the state to enact data rights law.

The above examples are used for providing further detailed description of the object, technical solutions, and advantages of the present disclosure, it should be understood that, the above are merely preferable examples of the present disclosure and are not used to limit the present disclosure. For one skilled in the art, various modifications and changes may be made to the present disclosure. Any amendments, equivalent replacements, improvements and so on, made without departing from the spirit and principle of the present disclosure, shall be covered by the scope of the present disclosure.

What is claimed is:

1. A method for data ownership confirmation based on encryption, comprising the following steps:
   A) determining whether data can be open to the public; and if the data can be open to the public, encrypting, by a data owner, the data by using a private key of the data owner to complete ownership declaration, and ending a process; or if the data cannot be open to the public, proceeding to step B; and
   B) determining whether the data can be shared; and if the data cannot be shared, encrypting, by the data owner, the data by using a public key of the data owner to complete data protection, and ending the process; or if the data can be shared, proceeding to ownership declaration and protection steps,
   wherein the ownership declaration and protection steps are agent ownership declaration and protection steps, and the agent ownership declaration and protection steps are as follows:
   determining whether the data needs an agent; and if the data does not need an agent, performing ownership declaration and protection on the data by using own ownership declaration and protection steps; or if the data needs an agent, proceeding to step C1;
   C1) determining whether the data owner needs to declare data ownership; and if the data owner does not need to declare data ownership, proceeding to step C2; or if the data owner needs to declare data ownership, encrypting, by the data owner, the data by using the private key of the data owner to complete ownership declaration, and proceeding to step C2;
   C2) encrypting, by a data agent, the data by using a public key of the data agent; and
   C3) determining whether the third-party data agent needs to declare data ownership; and if the data agent does not need to declare data ownership, ending the process; or if the data agent needs to declare data ownership, encrypting, by the data agent, the data by using a private key of the data agent to complete ownership declaration.

2. The method for data ownership confirmation based on encryption according to claim 1, wherein if the data needs an agent, the method further comprises:
   encrypting, by the data owner, the data by using the public key of the data agent, and granting a permission of data processing to the data agent; and
   decrypting, by the data agent, the data by using the private key, and performing ownership confirmation on the data by using the agent ownership declaration and protection steps.

3. The method for data ownership confirmation based on encryption according to claim 2, wherein the permission is granted by using the following method steps:
   sending, by the data agent, identity information encrypted by using the private key to the data owner; and performing, by the data owner, an authorization confirmation on the data agent based on the identity information, and agreeing on an operation permission of the data agent for the data.

4. A system for data ownership confirmation based on encryption, comprising:
   a processor, and
   a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and
   the ownership confirmation module implements data ownership confirmation and data protection by using the method according to claim 3.

5. The method for data ownership confirmation based on encryption according to claim 2, wherein the permission is granted by using the following method steps:
   encrypting, by the data owner by using the public key of the data agent, the data that needs an agent; and
   retrieving, by the data agent, the data encrypted by using the public key of the data agent, and performing, by the data agent, a data agent operation based on content of an authorization contract.

6. A system for data ownership confirmation based on encryption, comprising:
   a processor, and
   a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and
   the ownership confirmation module implements data ownership confirmation and data protection by using the method according to claim 5.

7. A system for data ownership confirmation based on encryption, comprising:
   a processor, and
   a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and
   the ownership confirmation module implements data ownership confirmation and data protection by using the method according to claim 2.

8. The system for data ownership confirmation based on encryption according to claim 7, further comprising an ownership confirmation contract management module, wherein the ownership confirmation contract management module confirms an ownership confirmation sequence of data owners.

9. A system for data ownership confirmation based on encryption, comprising:
   a processor, and
   a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and
   the ownership confirmation module implements data ownership confirmation and data protection by using the method according to claim 1.

10. The system for data ownership confirmation based on encryption according to claim 9, further comprising an ownership confirmation contract management module, wherein the ownership confirmation contract management module confirms an ownership confirmation sequence of data owners.

11. The method for data ownership confirmation based on encryption according to claim 1, wherein the ownership declaration and protection steps are own ownership declaration and protection steps, and the own ownership declaration and protection steps are as follows:
   encrypting, by the data owner, the data by using the public key of the data owner to complete data protection; and determining whether data ownership needs to be declared; and if data ownership does not need to be declared, ending the process; or if data ownership needs to be declared, encrypting, by the data owner, the data by using the private key of the data owner to complete ownership declaration.

12. A method for data ownership confirmation based on encryption, comprising the following steps:
   A) determining whether data can be open to the public; and if the data can be open to the public, encrypting, by a data owner, the data by using a private key of the data owner to complete ownership declaration, and ending a process; or if the data cannot be open to the public, proceeding to step B; and
   B) determining whether the data can be shared; and if the data cannot be shared, encrypting, by the data owner, the data by using a public key of the data owner to complete data protection, and ending the process; or if the data can be shared, proceeding to ownership declaration and protection steps,
   wherein if there are K data owners and K is a natural number greater than 1, the method further comprises:
   an ownership sequence confirmation step: confirming a sequence of the data owners as $U_1, U_2, \ldots, U_K$; and
   an active concatenated ownership confirmation step: after performing ownership confirmation, encrypting, by a data owner, the data by using a public key of a next data owner; and decrypting, by the next data owner, the data by using a private key, and performing ownership confirmation according to steps A and B wherein the active concatenated ownership confirmation step is cycled until ownership confirmation of the K data owners is completed.

13. A system for data ownership confirmation based on encryption, comprising:
   a processor, and
   a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and
   the ownership confirmation module implements data ownership confirmation and data protection by using the method according to claim 12.

14. A method for data ownership confirmation based on encryption, comprising the following steps:
   A) determining whether data can be open to the public; and if the data can be open to the public, encrypting, by a data owner, the data by using a private key of the data owner to complete ownership declaration, and ending a process; or if the data cannot be open to the public, proceeding to step B; and B) determining whether the data can be shared; and if the data cannot be shared, encrypting, by the data owner, the data by using a public key of the data owner to complete data protection, and ending the process; or if the data can be shared, proceeding to ownership declaration and protection steps, wherein if there are K data owners and K is a natural number greater than 1, the method further comprises:

an ownership sequence confirmation step: confirming a sequence of the data owners as $U_1, U_2, \ldots, U_k$; and a passive concatenated ownership confirmation step: separately encrypting, by the data owners, the data by using public keys of the data owners in the ownership sequence, and then encrypting, by a data agent, the data by using a private key, to declare ownership of the data.

15. A system for data ownership confirmation based on encryption, comprising:

a processor, and a non-transitory computer-readable medium comprising stored thereon a public key management module and an ownership confirmation module, wherein the public key management module identifies and determines an identity of a data owner and/or an identity of a data agent, and confirms a correspondence between the data owner and a public key; and the ownership confirmation module implements data ownership confirmation and data protection by using the method according to claim 14.

* * * * *